United States Patent [19]

Ono

[11] Patent Number: 5,688,840
[45] Date of Patent: Nov. 18, 1997

[54] PROCESS FOR PREPARING ROOM TEMPERATURE-CURABLE ORGANOPOLYSILOXANE COMPOSITION

[75] Inventor: Kazuhisa Ono, Tokyo, Japan

[73] Assignee: Toshiba Silicone Co., Ltd., Tokyo, Japan

[21] Appl. No.: 538,850

[22] Filed: Oct. 4, 1995

[30] Foreign Application Priority Data

Oct. 4, 1994 [JP] Japan .................... 6-240095

[51] Int. Cl.$^6$ .................... C08K 9/02
[52] U.S. Cl. .................... 523/209; 523/213; 524/863; 524/847
[58] Field of Search .................... 524/863, 847; 523/213, 209

[56] References Cited

U.S. PATENT DOCUMENTS

| | | | |
|---|---|---|---|
| 4,537,944 | 8/1985 | Imai et al. .................... | 528/15 |
| 4,760,123 | 7/1988 | Imai et al. .................... | 528/34 |
| 5,061,739 | 10/1991 | Shimizu .................... | 524/863 |
| 5,087,684 | 2/1992 | Perrin .................... | 523/213 |
| 5,508,360 | 4/1996 | Cifuentes et al. .................... | 528/34 |

*Primary Examiner*—Karen A. Dean
*Attorney, Agent, or Firm*—Sughrue, Mion, Zinn, Macpeak and Seas.

[57] ABSTRACT

A process for preparing a room temperature-curable organopolysiloxane composition comprising (A) (A-1) a specific organopolysiloxane or a mixture of (A-1) and (A-2) a specific silicone compound or a partial hydrolysis product thereof, (B) silica powder having a specific surface area of 20 to 800 m$^2$/g, (C) a curing catalyst, and (D) a silane coupling agent or an organopolysiloxane having a specific substituent, which comprises adding component (D) to component (A) prior to kneading or at the time of kneading components (A) and (B). The composition exhibits excellent physical characteristics, excellent workability in terms of flowability, adhesion, and extrudability, undergoes no change in viscosity with time and, in particular, suffers no impairment of these characteristics when stored for a long period of time.

6 Claims, 1 Drawing Sheet

FIGURE
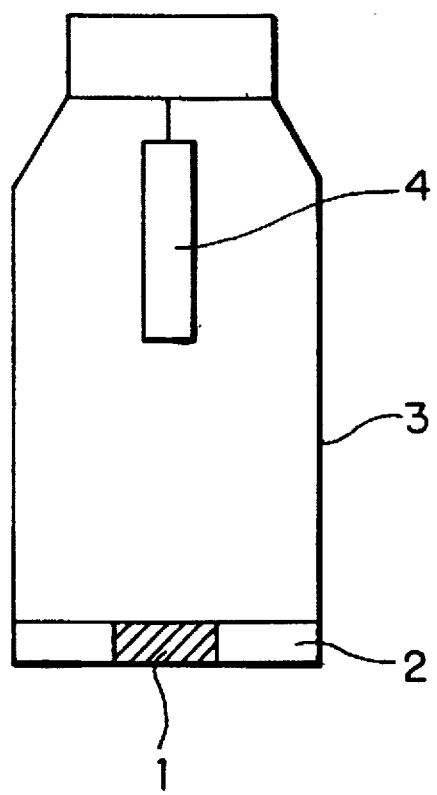

PROCESS FOR PREPARING ROOM TEMPERATURE-CURABLE ORGANOPOLYSILOXANE COMPOSITION

FIELD OF THE INVENTION

This invention relates to a process for preparing a room temperature-curable organopolysiloxane composition capable of changing to a rubber or gel through a curing reaction. More particularly, it relates to a process effective to provide a composition endowed with flowability and extrudability, the composition suffering no deterioration in workability and physical characteristics, such as viscosity, even when stored for a long period of time.

BACKGROUND OF THE INVENTION

It is known that incorporation of silica as a filler in an organopolysiloxane composition capable of curing into a rubber is effective to improve the mechanical strength of the composition. However, cases are sometimes encountered, wherein an organopolysiloxane composition having added thereto a silica filler as such suffers a thickening phenomenon, formation of a structure, a creep curing phenomenon, and the like, with the passage of time due to the free hydroxyl group of silica.

In order to solve the above technical problem, a number of studies on surface treatment of silica have been developed.

One of the early attempted approaches consists of a heat treatment of silica at an extremely high temperature, i.e., 200° C. or higher, thereby to expel all the hydroxyl groups from the filler. It turned out, however, that such a treatment makes the filler tend to agglomerate and ultimately makes the filler no longer free-flowing. Besides, when the heated filler is cooled to room temperature, it exhibits high hygroscopic properties and easily absorbs moisture in the atmosphere. Processing of such a filler was very difficult.

A process comprising treating a filler with a cyclic siloxane was proposed later as disclosed in U.S. Pat. No. 2,938,009 to Lucas. The siloxane is split during the treatment and bonded to a free hydroxyl group so that the free hydroxyl groups of the filler lose the reactivity. It was revealed therefore that the treatment of a filler according to the Lucas process provides a silicone rubber composition which is less liable to structure formation. It was also proven that the thus treated filler provides a silicone rubber composition having improved physical characteristics. However, since it is only a part of free hydroxyl groups that are restrained or expelled even by the Lucas process, the problem of deterioration of workability of the composition with time still remained unsolved.

Hence, researchers continued the study in this field. As a result, a process comprising treating a filler in a solvent with a monoalkoxysilane, such as phenyldimethylethoxysilane, and a primary organic amine compound, such as n-hexylamine, at a time has been proposed as described in U.S. Pat. No. 3,024,126 to Brawn. While use of the silica filler treated by the Brawn process provides a silicone rubber composition having somewhat improved stability with time and endowed with favorable physical characteristics, it turned out that a substantial amount of free hydroxyl groups still remain free from restraint or exclusion.

An improvement on the patent to Brawn is found in U.S. Pat. No. 3,635,743 to Smith, in which a filler is treated with ammonia or an ammonia derivative as a pretreatment preceding a treatment with a silicone compound. In more detail, a filler should be treated first with an ammonia derivative or an amine compound separately and independently, then, while not essential, with an alkyl cyclic polysiloxane, and finally must be treated with a silyl nitrogen compound. What is important in this process is that a filler must be treated first with ammonia or an ammonia derivative separately and independently. In the subsequent second step, the filler is treated with a silicone compound including a silazane compound. It is mentioned that the benefit of the process cannot be assured unless these treatment steps are separate and independent. The Smith process is advantageous in that free hydroxyl groups are restrained or substituted by the triorganosiloxane group at high efficiency not heretofore reached and therefore the filler can be treated to a satisfactory degree. A cured product of a silicone rubber composition containing the Smith filler exhibits improved physical characteristics. It has been revealed, however, that the physical characteristics of a silicone rubber composition containing the Smith filler are not always favorable for some uses. That is, the composition in an uncured state does not show sufficient storage stability and increases in viscosity with time.

Further, JP-A-49-98861 (the term "JP-A" as used herein means an "unexamined published Japanese patent application") discloses a process comprising simultaneously treating a silica filler with three kinds of treating agents; hydroxylamine, a cyclic siloxane, and a silyl nitrogen compound. According to the process, there is obtained a composition which has improved storage stability and provides a silicone rubber with favorable physical properties for some uses. However, the process encounters difficulty in removing the amine and silyl nitrogen compound and their decomposition products remaining in the preparation system so that the resulting composition has insufficient storage stability and suffers an increase in viscosity with time, and the cured composition has insufficient physical characteristics.

JP-A-53-141362 discloses a method for preventing color change of a composition on heating and vulcanization, which comprises incorporating an organohydrogen polysiloxane and silica fine which has been treated with an organosilazane. Although this method is effective for prevention of color change, the composition is still unsatisfactory in storage stability.

In order to eliminate these problems, JP-B-64-22179 (the term "JP-B" as used herein means an "examined published Japanese patent application") proposes an in-process treatment of a silica filler with an organopolysiloxane, a monosilanol, and a silazane compound to obtain an organopolysiloxane composition excellent in storage stability. However, the process is not applicable to an organopolysiloxane having a silanol group as a reactive group. In addition, removal of remaining excess treating agents and ammonia or an ammonia derivative resulting from decomposition of the silazane compound requires much time and labor, and yet an ammonia odor cannot be removed completely. Should ammonia or an ammonia derivative remain in the cured composition, the composition causes corrosion of copper-based metals, etc. and is therefore difficult to apply to electric and electronic parts.

SUMMARY OF THE INVENTION

An object of the present invention is to provide a room temperature-curable organopolysiloxane composition excellent in workability (e.g., flowability, improved adhesion, and extrudability), storage stability, and physical characteristics.

As a result of extensive investigations, the inventors of the present invention have found that an in-process treatment of a silica filler with an amino-containing silicon compound (i.e., silanes and siloxanes) together with an organopolysiloxane provides an organopolysiloxane composition in which the residue of the treating agents used for the treatment of the silica filler, if any, causes no adverse influence on the characteristics of the composition and which has excellent storage stability. The present invention has been reached based on this finding.

The present invention provides a process for preparing a room temperature-curable organopolysiloxane composition comprising:

(A) 100 parts by weight of (A-1) an organopolysiloxane containing at least one structural unit represented by formula (I):

$$R^1_aX^1_bSiO_{(4-a-b)/2} \quad (I)$$

wherein $R^1$ which may be the same or different each represents a substituted or unsubstituted monovalent hydrocarbon group; $X^1$ represents a hydroxyl group or a hydrolyzable group; a represents an integer of 0 to 2, and b represents an integer of 1 to 3, provided a+b is 1 to 3; and having a viscosity of 50 to 500,000 cSt at 25° C. and (A-2) a silicon compound represented by formula (II):

$$R^2_cSiX^2_{4-c} \quad (II)$$

wherein $R^2$ which may be the same or different each represents a substituted or unsubstituted monovalent hydrocarbon group or a hydrogen atom; $X^2$ represents a hydrolyzable group; and c represents an integer of 0 to 2; or a partial hydrolysis product thereof, with the proviso that the amount of (A-1) is from 80 to 100% by weight based on the total weight of (A-1) and (A-2), (B) 1.0 to 200 parts by weight of silica powder having a specific surface area of 20 to 800 m²/g, (C) 0.01 to 25 parts by weight of a curing catalyst, and (D) a silane coupling agent represented by formula (III) or (IV):

$$R^4_dY_{3-d}Si-Z-NR^5_eR^6_{2-e} \quad (III)$$

$$R^4_dY_{3-d}Si-NR^5_eR^6_{2-e} \quad (IV)$$
$$\underset{Z}{\backslash /}$$

or an organopolysiloxane having a substituent represented by $$-Z-NR^5_eR^6_{2-e}, \quad -NR^5_eZSiR^4_dY_{3-d},$$

or $$-N-SiR^4_dY_{3-d}$$
$$\underset{Z}{\backslash /}$$

wherein $R^4$ and $R^5$, which may be the same or different, each represent a substituted or unsubstituted monovalent hydrocarbon group or a hydrogen atom; $R^6$ represents —SiR$^7_f$W$_{3-f}$ (wherein $R^7$ which may be the same or different each represents a substituted or unsubstituted monovalent hydrocarbon group or a hydrogen atom; W represents a hydrolyzable group; and f represents an integer of 0 to 3); Y represents a hydrolyzable group; Z represents a substituted or unsubstituted divalent hydrocarbon group; d represents an integer of 0 to 3; and e represents an integer of 0 to 2, (D) being used in such an amount that it contains 300 to 3,000,000 ppm of nitrogen atom per 100 parts by weight of (A-1), which comprises adding component (D) to component (A) prior to kneading or at the time of kneading components (A) and (B).

BRIEF DESCRIPTION OF THE DRAWING

FIG. 1 is an illustration of a corrosion test taken in Examples.

DETAILED DESCRIPTION OF THE INVENTION

The organopolysiloxane as component (A-1) comprises a structural unit of formula (I) and contains at least one reactive group $X^1$ directly bonded to the silicon atom per molecule. It may have either a linear structure or a branched structure or a mixed structure thereof.

In formula (I), $R^1$ which may be the same or different is a substituted or unsubstituted monovalent hydrocarbon group. Examples of $R^1$ include alkyl groups, e.g., methyl, ethyl, propyl, butyl, hexyl, and dodecyl groups; aryl groups, e.g., phenyl, xylyl and tolyl groups; aralkyl groups, e.g., benzyl, β-phenylethyl and β-phenylpropyl groups; and substituted hydrocarbon groups, such as halogenated alkyl groups, e.g., chloromethyl and 3,3,3-trifluoropropyl groups, and cyanoalkyl groups, e.g., cyanoethyl and cyanopropyl groups. Of those, methyl is most preferred from the points that the compounds of formula (I) wherein $R^1$ is methyl are easy to synthesize and provide a composition having a low viscosity before curing and which retains satisfactory physical characteristics after curing. For the purpose of endowing the composition with heat resistance, solvent resistance, and the like, part of $R^1$ may be replaced with a phenyl group, a 3,3,3-trifluoropropyl group, etc.

Component (A-1) should contain at least one hydrolyzable group represented by $X^1$ which can be selected from, for example, alkoxy groups, such as a methoxy group and an ethoxy group, in conformity with the reaction mechanism for obtaining a rubber-like elastic body or gel.

Component (A-1), which serves as a base polymer of the organopolysiloxane composition of the present invention, includes diorganopolysiloxanes of formula (I) wherein at least two of the groups represented by $X^1$ bonded to the silicon atom per molecule are selected from a hydroxyl group, an alkoxy group, e.g., a methoxy or ethoxy group, an amido group, a carbamate group, an epoxy group, an isocyanate group, and an acetoxy group, which have a viscosity of 50 to 500,000 cSt at 25° C. The reactive group as $X^1$ may be present at the terminal and/or in the middle of the molecular chain. It is preferably present at least at the terminal in order that the cured composition exhibits excellent mechanical properties.

The silicon compound of formula (II) or a partial hydrolysis product thereof as component (A-2) acts as a crosslinking agent which reacts with the reactive group $X^1$ of component (A-1) in the presence of water and a curing catalyst thereby to cure the composition. $R^2$ in formula (II) includes the same organic groups as exemplified for $R^1$ in formula (I). From the standpoint of availability and curing rate, $R^2$ is preferably a methyl group or a vinyl group. $X^2$ in formula (II) includes the same reactive groups as exemplified for $X^1$ in formula (I).

Examples of suitable component (A-2) are tetramethoxysilane, methyltrimethoxysilane, ethyltrimethoxysilane, vinyltrimethoxysilane, phenyltrimethoxysilane, tetraethoxysilane, methyltriethoxysilane, methyltriisopropoxysilane, phenyltriethoxysilane, tetrakis(ethoxyethoxy)silane, methyltris(methoxyethoxy)silane, vinyltris(methoxyethoxy) silane, tetra(methyl ethyl ketoxime)silane, methyltri(methyl ethyl ketoxime)silane, vinyltri(methyl ethyl ketoxime)

silane, methyltriacetoxysilane, vinyltriacetoxysilane, methyltriacetamidosilane, and methyltriisocyanatosilane; and partial hydrolysis products of these silane compounds, i.e., siloxanes.

From the viewpoint of ease of synthesis and acceleration of curing without impairing storage stability of the composition, preferred of them are tetramethoxysilane, vinyltrimethoxysilane, methyltris(methoxyethoxy)silane, vinyltris(methoxyethoxy)silane, tetra(methyl ethyl ketoxime)silane, vinyltri(methyl ethyl . ketoxime)silane, methyltriacetoxysilane, and vinyltriacetoxysilane.

Component (A) consists solely of base polymer (A-1) which may have self-crosslinkability or a mixture of (A-1) and crosslinking agent (A-1). The proportion of (A-2) in component (A) ranges from 80 to 100% by weight based on the total weight of (A-1) and (A-2). If component (A-2) exceeds 20% by weight, not only is it separated from the composition during storage, but the composition undergoes considerable shrinkage on curing only to provide a rubber-like elastic body with reduced properties.

Where component (A-1) contains more than two hydrolyzable groups per molecule on the average, the in-process reaction proceeds in the presence of moisture and a curing catalyst without the aid of component (A-2), and yet it is recommended, for good balance between curing properties and mechanical properties after curing, to use component (A-2) in combination in an amount of 0.4 to 5% by weight based on the total weight of (A-1) and (A-2).

Silica powder as component (B) is a reinforcing agent in the rubber or gel after curing of the silicone composition. The silica powder should have a specific surface area of 20 to 800 $m^2/g$. If the specific surface area is less than 20 $m^2/g$, the reinforcing action for the organopolysiloxane is insufficient. Particles having a specific surface area exceeding 800 $m^2/g$ easily agglomerate and are not suited for the silicone composition of the present invention. Suitable silica powder includes fumed silica, wet process silica, and fused silica. These silica powders may be used either individually or as a combination of two or more thereof.

Component (B) is used in an amount of 1.0 to 200 parts by weight per 100 parts by weight of component (A). At an amount less than 1.0 part by weight, the cured composition has insufficient mechanical strength. Amounts exceeding 200 parts by weight are difficult to incorporate, failing to provide a uniform composition. The silica powder to be used may or may not be pre-treated, but it should be noted that cases are sometimes observed, in which silica powder which has been treated with a trimethylsilyl group to a high degree exerts low reinforcing effects. A preferred amount of component (B) ranges from 5.0 to 50 parts by weight per 100 parts by weight of component (A).

Component (C) is a curing catalyst for catalyzing the curing reaction of (A-1) or a mixture of (A-1) and crosslinking agent (A-2) in the presence of moisture to give a rubber-like elastic body. Examples of suitable curing catalyst (C) include carboxylic acid metal salts, such as iron octanoate, cobalt octanoate, manganese octanoate, zinc octanoate, tin naphthenate, tin caprylate, and tin oleate; organotin compounds, such as dimethyltin dioleate, dimethyltin dilaurate, dibutyltin dioleate, diphenyltin diacetate, dibutyltin oxide, dibutyltin dimethoxide, dibutylbis(triethoxysiloxy)tin, and dioctyltin dilaurate; and organotitanium compounds, such as titanium tetrapropoxide, titanium tetrabutoxide, and diisopropoxybis(ethyl acetylacetonato)titanium. Component (C) is used in an amount of 0.01 to 25 parts by weight, preferably 0.1 to 5 parts by weight, per 100 parts by weight of component (A). If the amount of component (C) is less than 0.01 part by weight, sufficient action as a curing catalyst is not exerted so that curing reaction takes much time and, curing of the composition is insufficient especially in a deep portion remote from the surface in contact with air. If the amount exceeds 25 parts by weight, the storage stability of the composition is impaired.

Component (D) is a silane coupling agent represented by formula (III) or (IV) or an organopolysiloxane containing a specific substituent, which acts as a surface treating agent for silica powder and also exercises a catalyst-like action for facilitating mixing of component (A) and silica powder (B). That is, the amino group of component (D) accelerates hydrolysis of the reactive group of component (A) thereby treating the silanol group on the surface of silica powder. Further, the treatment of silica is also conducted through the mutual action between the active hydrogen of the amino group and the silanol group on the surface of silica powder and through the reaction between the reactive group (hydrolyzable group) of component (D) and the silanol group on the surface of silica powder. Therefore, component (D) preferably includes aminoalkyl-containing silicone compounds the hydrolyzable group of which exhibits high reactivity. Component (D) is used in such an amount that it contains 300 to 3,000,000 ppm of nitrogen per 100 parts by weight of component (A-1). If the amount of nitrogen is less than 300 ppm, the treatment of silica powder cannot be carried out sufficiently. If it exceeds 3,000,000 ppm, there is a possibility of adverse influences being exerted on the storage stability and mechanical characteristics of the composition. A preferred concentration of nitrogen of component (D) is 1,200 to 300,000 ppm.

Component (D) includes silane coupling agents having a hydrolyzable group capable of reacting with the silanol group present on the surface of silica powder, e.g., an acetoxy group, an amino group, an isopropenoxy group, a ketoximato group, an isocyanate group, an amido group, and an alkoxy group. The amine moiety of the aminoalkyl group includes a primary amino group ($H_2N-$) and a secondary amino group ($HR \cdot H-$), with a primary amino group being preferred for its reactivity and catalyst-like action. Of tertiary amino groups, those capable of conversion to a primary or secondary amino group are usable as well. The primary amines as component (D) include an aminoalkylalkoxysilane and an aminoalkylketoximatosilane; the secondary amines include an N-trialkylsilyl-3-aminopropropyltrialkoxysilane, an N-phenylaminoalkylalkoxysilane, and an N-methylaminoalkylalkoxysilane; And tertiary amines include 1,1-dialkoxy-2-trialkylsilyl-1-sila-2-azacyclopentane and an N,N-dimethylaminoalkylalkoxysilane. Siloxane compounds containing a substituted or unsubstituted amino group similarly to the silane coupling agents can also be used as component (D), and those containing the same hydrolyzable reactive group as mentioned for the silane coupling agents are preferred. Taking separation during storage and corrosion of metal into consideration, aminoalkylalkoxysilanes, amino-containing siloxanes, and the like are preferred. A particular preference is given to aminoalkylalkoxysilanes from the viewpoint of not only their catalyst-like action for facilitating mixing of silica powder with other components but their surface treating activity on silica. The same preference applies also from the viewpoint of separation after curing.

If desired, the composition of the present invention may further comprise various additives for improving characteristics of the cured product, i.e., silicone rubber or gel, such as heat resistance improving agents, flame retarders, additives for electrical conduction, and additives for heat emission. The amount of these additives is selected arbitrarily as far as the characteristics of the resulting silicone rubber or gel are not impaired.

The feature of the process of the present invention resides in that an aminoalkoxysilane or an amino-containing siloxane as component (D) is added to component (A) prior to kneading or at the time of kneading components (A) and (B) to conduct in-process treatment of silica powder (B) to provide a room temperature-curable organopolysiloxane composition which exhibits excellent physical characteristics, excellent workability in terms of flowability, adhesion, and extrudability, and, in particular, excellent storage stability without suffering impairment of these characteristics even when stored for a long period of time.

The composition of the present invention is obtained by kneading in a kneader at a temperature of 0° to 100° C. for a period of 0.5 to 10 hours, preferably 1 to 5 hours. If necessary, the resulting mixture is heat-treated under reduced pressure at 50° to 200° C. for 0.5 to 10 hours, followed by cooling to room temperature.

The thus prepared composition can be cured by an appropriate curing method into a rubber or gel for practical application.

The in-process treatment of a silica filler with a silane, a siloxane or a nitrogen-containing organic compound in the co-presence of an organopolysiloxane provides a room temperature-curable organopolysiloxane composition which exhibits excellent physical characteristics, excellent workability in terms of flowability, adhesion, and extrudability, and, in particular, excellent storage stability without suffering impairment of these characteristics even when stored for a long period of time.

The silicone composition prepared by the process of the present invention is widely useful as a molding compound or a potting compound for production of electronic parts, etc., similarly to conventional liquid silicone rubber, gel or millable silicone rubber.

The present invention will now be illustrated in greater detail with reference to Examples, but it should be understood that the present invention is not construed as being limited thereto. Unless otherwise indicated, all the parts are by weight, and all the values of physical properties, such as viscosity, are those measured at 25° C. and 60% RH.

EXAMPLE 1

In a universal kneader were charged 100 parts of α,ω-bis(methyldimethoxysilyl)dimethyl polysiloxane having a viscosity of 20,000 cP, 15 parts of fumed silica having a specific surface area of 200 m²/g, and 0.5 part of γ-aminopropyltrimethoxysilane (nitrogen atom content: 39,000 ppm) and kneaded at room temperature for 1 hour to obtain uniform base compound B-1. A hundred parts of base compound B-1 were mixed uniformly with 1.5 parts of methyltrimethoxysilane, 2 parts of N-trimethylsilyl-γ-aminopropyltrimethoxysilane, and 0.3 part of dibutyltin dilaurate under a moisture-free condition, followed by degassing to obtain composition C-1.

Composition C-1 was evaluated by measuring viscosity, dry tack time, and physical properties (according to JIS K-6301) in the initial stage, after allowing to stand at room temperature, and after accelerated aging at 70° C. for 5 days. The results obtained are shown in Table 1 below.

The tensile shear adhesive strength of the composition was measured using test pieces of copper, aluminum, an acrylic resin or a polycarbonate resin as adherends. The results obtained are also shown in Table 1.

The corrosive action of the composition on copper was examined as follows. As shown in FIG. 1, 15 g of composition 1 and 10 g of deionized water 2 were put in 500 ml-volume glass bottle 3, and 1 mm thick copper plate 4 with its surface polished with sand paper to expose its active surface was suspended in the upper portion of glass bottle 3. After sealing the bottle, the contents were heated at 40° C. for 168 hours. The condition of the copper plate was observed in comparison with a blank test in which composition 1 was not put in bottle 3. The results are also shown in Table 1.

EXAMPLE 2

In a universal kneader were charged 100 parts of α,ω-bis(methyldimethoxysilyl)dimethyl polysiloxane having a viscosity of 20,000 cP and 15 parts of fumed silica having a specific surface area of 200 m²/g and kneaded at room temperature for 1 hour to obtain uniform base compound B-2. A hundred parts of base compound B-2 and 0.5 part of γ-aminopropyltrimethoxysilane (nitrogen atom content: 39,000 ppm) were charged in a universal kneader and kneaded at room temperature for 2 hours to give uniform base compound B-3. A hundred parts of base compound B-3 were mixed uniformly with 1.5 parts of methyltrimethoxysilane, 2 parts of N-trimethylsilyl-γ-aminopropyltrimethoxysilane, and 0.3 part of dibutyltin dilaurate under a moisture-free condition, followed by degassing to obtain composition A-2.

Composition C-2 was evaluated in the same manner as in Example 1. The results obtained are shown in Table 1.

COMPARATIVE EXAMPLES 1 AND 2

A hundred parts of base compound B-2 prepared in Example 2 were uniformly mixed with 1.5 parts of methyltrimethoxysilane, 2 parts of N-trimethylsilyl-γ-aminopropyltrimethoxysilane, and 0.3 part of dibutyltin dilaurate under a moisture-free condition, followed by degassing to obtain composition A-3 (Comparative Example 1).

Composition A-3 was evaluated in the same manner as in Example 1. The results obtained are shown in Table 1.

In a universal kneader were charged 100 parts of α,ω-bis(methyldimethoxysilyl)dimethyl polysiloxane having a viscosity of 20,000 cP and 15 parts of fumed silica having a specific surface area of 200 m²/g and kneaded at room temperature for 1 hour and then at 130° C. under reduced pressure for 3 hours, followed by cooling to room temperature to obtain uniform base compound B-4. A hundred parts of base compound B-4 were mixed uniformly with 1.5 parts of methyltrimethoxysilane, 2 parts of N-trimethylsilyl-γ-aminopropyltrimethoxysilane, and 0.3 part of dibutyltin dilaurate under a moisture-free condition, followed by degassing to obtain composition A-4 (Comparative Example 2).

Composition A-4 was evaluated in the same manner as in Example 1. The results obtained are shown in Table 1.

COMPARATIVE EXAMPLE 3 AND EXAMPLES 3 AND 4

In a universal kneader were charged 100 parts of α,ω-bis(methyldimethoxysilyl)dimethyl polysiloxane having a viscosity of 20,000 cP, 15 parts of fumed silica having a specific surface area of 200 m²/g, and 1.0 part of diisobutylamine and kneaded at room temperature for 1 hour to obtain uniform base compound B-5.

TABLE 1

|  | Example 1 C-1 | Example 2 C-2 | Compar. Example 1 A-3 | Compar. Example 2 A-4 | Compar. Example 3 A-5 | Example 3 A-6 | Example 4 A-7 | Example 5 A-8 |
| --- | --- | --- | --- | --- | --- | --- | --- | --- |
| Initial Physical Properties: | | | | | | | | |
| Viscosity P (poise) | 600 | 650 | non-flowable | 1000 | 800 | 810 | 620 | 580 |
| Dry tack time (min) | 5 | 5 | 5 | 6 | 8 | 8 | 5 | 5 |
| Hardness (JIS A) | 16 | 17 | 16 | 15 | 15 | 15 | 15 | 15 |
| Tensile strength (kgf/cm$^2$) | 12 | 12 | 11 | 11 | 11 | 11 | 12 | 12 |
| Elongation (%) | 300 | 290 | 200 | 280 | 260 | 280 | 320 | 310 |
| Physical Properties after Aging (70° C. × 5 dys): | | | | | | | | |
| Viscosity (cP) | 590 | 645 | non-flowable | non-flowable | 500 | 850 | 630 | 600 |
| Dry tack time (min) | 5 | 5 | 5 | 5 | 15 | 8 | 5 | 5 |
| Hardness (JIS A) | 15 | 16 | 14 | 14 | 7 | 14 | 15 | 15 |
| Tensile strength (kgf/cm$^2$) | 11 | 11 | 9 | 10 | 7 | 11 | 11 | 11 |
| Elongation (%) | 310 | 300 | 200 | 260 | 380 | 290 | 330 | 320 |
| Tensile Shear Adhesive Strength (kgf/cm$^2$)*: | | | | | | | | |
| Copper | 12 (100) | 12 (100) | 9 (80) | 10 (90) | 6 (70) | 10 (100) | 13 (100) | 12 (100) |
| Aluminum | 14 (100) | 13 (100) | 10 (100) | 10 (100) | 8 (100) | 11 (100) | 13 (100) | 12 (100) |
| Acrylic resin | 11 (100) | 11 (100) | 3 (0) | 4 (10) | 2 (30) | 9 (100) | 10 (100) | 11 (100) |
| Polycarbonate | 12 (100) | 11 (100) | 5 (30) | 4 (20) | 3 (30) | 10 (100) | 12 (100) | 11 (100) |
| Corrosion of Cu | none | none | none | none | observed | none | none | none |

Note: *Values in the parentheses are rates of cohesive failure (%) (hereinafter the same).

Base compounds B-6 and B-7 were prepared in the same manner as for base compound B-5, except for replacing the diisobutylamine with 1.5 parts of 1,3-bis(3-aminopropyl)-tetramethyldisiloxane (nitrogen atom content: 170,000 ppm) or 1.0 part of 1,1-dimethoxy-2-trimethylsilyl-1-sila-2-azacyclopentane (nitrogen atom content: 64,000 ppm), respectively.

A hundred parts of each of base compounds B-5, B-6, and B-7 were mixed uniformly with 1.5 parts of methyltrimethoxysilane, 2 parts of N-trimethylsilyl-γ-aminopropyltrimethoxysilane, and 0.3 part of dibutyltin dilaurate under a moisture-free condition, followed by degassing to obtain composition A-5, A-6 or A-7, respectively.

Compositions A-5, A-6 and A-7 were evaluated in the same manner as in Example 1. The results obtained are shown in Table 1.

EXAMPLE 5

In a universal kneader were charged 90 parts of α,ω-bis(methyldimethoxysilyl)dimethyl polysiloxane having a viscosity of 20,000 cP, 10 parts of α,ω-bis(3-aminopropyldimethoxysilyl)dimethyl polysiloxane (nitrogen atom content: 1,900 ppm), and 15 parts of fumed silica having a specific surface area of 200 m$^2$/g, and kneaded at room temperature for 1 hour to obtain uniform base compound B-8. A hundred parts of base compound B-8 were mixed uniformly with 1.5 parts of methyltrimethoxysilane, 2 parts of N-trimethylsilyl-γ-aminopropyltrimethoxysilane, and 0.3 part of dibutyltin dilaurate under a moisture-free condition, followed by degassing to obtain composition A-8.

Composition A-8 was evaluated in the same manner as in Example 1. The results obtained are shown in Table 1.

EXAMPLE 6

In a universal kneader were charged 100 parts of α,ω-bis(methyldimethoxysilyl)dimethyl polysiloxane having a viscosity of 20,000 cP, 15 parts of octamethylcyclotetrasiloxane-treated fumed silica having a specific surface area of 200 m$^2$/g, and 0.3 part of γ-aminopropyltriethoxysilane (nitrogen atom content: 1,900 ppm), and kneaded at room temperature for 2 hours to obtain uniform base compound B-9. A hundred parts of base compound B-9 were mixed uniformly with 1.5 parts of methyltrimethoxysilane, 2 parts of N-trimethylsilyl-γ-aminopropyltrimethoxysilane, and 0.3 part of dibutyltin in dilaurate under a moisture-free condition, followed by degassing to obtain composition A-9.

Composition A-9 was evaluated by measuring, dry tack time, physical properties, and tensile shear adhesive strength in the same manner as in Example 1. The results obtained are shown in Table 2.

Further, the composition was charged in a 330 ml-volume cartridge, the tip of the nozzle was cut off to make an orifice having an inner diameter of 6.2 mm, and the composition was extruded from the orifice by applying a load to the bottom of the cartridge by means of a tool. The extrusion force at that time was measured. The results obtained are also shown in Table 2.

COMPARATIVE EXAMPLE 4

In a universal kneader were charged 100 parts of α,ω-bis(methyldimethoxysilyl)dimethyl polysiloxane having a viscosity of 20,000 cP and 15 parts of octamethylcyclotetrasiloxane-treated fumed silica having a specific surface area of 200 m$^2$/g and kneaded at room temperature for 2 hours to obtain uniform base compound B-10. A hundred parts of base compound B-10 were mixed uniformly with 1.5 parts of methyltrimethoxysilane, 0.3 part of γ-aminopropyltriethoxysilane, 2 parts of N-trimethylsilyl-γ-aminopropyltrimethoxysilane, and 0.3 part of dibutyltin dilaurate under a moisture-free condition, followed by degassing to obtain composition A-10.

Composition A-10 was evaluated in the same manner as in Example 6. The results obtained are shown in Table 2.

EXAMPLE 7

A hundred parts of base compound B-10 prepared in Comparative Example 4 were uniformly mixed with 0.3 part of aminopropyltriethoxysilane (nitrogen atom content: 1,900 ppm) in a universal kneader at room temperature for 2 hours to obtain uniform base compound B-11. A hundred parts of base compound B-11 were uniformly mixed with 1.5 parts of methyltrimethoxysilane, 2 parts of N-trimethylsilyl-γ-aminopropyltrimethoxysilane, and 0.3 part of dibutyltin dilaurate under a moisture-free condition, followed by degassing to obtain composition A-11.

Composition A-11 was evaluated in the same manner as in Example 6. The results obtained are shown in Table 2.

TABLE 2

|  | Example 6 A-9 | Compar. Example 4 A-10 | Example 7 A-11 |
|---|---|---|---|
| Initial Physical Properties: |  |  |  |
| Extrusion force (kgf) | 13.0 | 16.0 | 13.0 |
| Dry tack time (min) | 5 | 5 | 5 |
| Hardness (JIS A) | 27 | 27 | 27 |
| Tensile strength (kgf/cm$^2$) | 14 | 13 | 14 |
| Elongation (%) | 320 | 280 | 320 |
| Physical Properties after Aging (70° C. × 5 dys): |  |  |  |
| Extrusion force (kgf) | 13.5 | 18.0 | 14.0 |
| Dry tack time (min) | 5 | 5 | 5 |
| Hardness (JIS A) | 26 | 25 | 26 |
| Tensile strength (kgf/cm$^2$) | 13 | 11 | 13 |
| Elongation (%) | 310 | 300 | 300 |
| Tensile Shear Adhesive Strength (kgf/cm$^2$): |  |  |  |
| Copper | 16(100) | 12(100) | 13(100) |
| Aluminum | 17(100) | 15(100) | 16(100) |
| Acrylic resin | 14(100) | 2(0) | 13(100) |
| Polycarbonate | 15(100) | 5(20) | 13(100) |

EXAMPLE 8

In a universal kneader were charged 100 parts of α,ω-bis(hydroxyl)dimethyl polysiloxane having a viscosity of 20,000 cP, 15 parts of octamethylcyclotetrasiloxane-treated fumed silica having a specific surface area of 200 m$^2$/g, and 0.5 part of γ-(β-aminoethyl)aminopropyltrimethoxysilane (nitrogen atom content: 63,000 ppm) and kneaded at room temperature for 2 hours to obtain uniform base compound B-12. A hundred parts of base compound B-12 were mixed uniformly with 2.0 parts of methyltri(methyl ethyl ketoxime)silane, and 0.3 part of dibutyltin dilaurate under a moisture-free condition, followed by degassing to obtain composition A-12.

Composition A-12 was evaluated in the same manner as in Example 6. In the tensile testing, adherends made of stainless steel, aluminum, an epoxy resin or glass were used. The results obtained are shown in Table 3.

COMPARATIVE EXAMPLE 5

In a universal kneader were charged 100 parts of α,ω-bis(hydroxyl)dimethyl polysiloxane having a viscosity of 20,000 cP and 15 parts of octamethylcyclotetrasiloxane-treated fumed silica having a specific surface area of 200 m$^2$/g and kneaded at room temperature for 2 hours to obtain uniform base compound B-13. A hundred parts of base compound B-13 were mixed uniformly with 2.0 parts of methyltri(methyl ethyl ketoxime)silane, 0.5 part of γ-(β-aminoethyl)aminopropyltrimethoxysilane (nitrogen atom content: 63,000 ppm), and 0.3 part of dibutyltin dilaurate under a moisture-free condition, followed by degassing to obtain composition A-13.

Composition A-13 was evaluated in the same manner as in Example 8. The results obtained are shown in Table 3.

EXAMPLE 9

In a universal kneader were charged 100 parts of α,ω-bis[methyldi(methyl ethyl ketoxime)silyl]dimethyl polysiloxane having a viscosity of 20,000 cP, 15 parts of octamethylcyclotetrasiloxane-treated fumed silica having a specific surface area of 200 m$^2$/g, and 0.5 part of γ-(β-aminoethyl)aminopropyltrimethoxysilane (nitrogen atom content: 63,000 ppm), and kneaded at room temperature for 2 hours to obtain uniform base compound B-14. A hundred parts of base compound B-14 were mixed uniformly with 1.5 parts of methyltri(methyl ethyl ketoxime)silane methyl ethyl ketoxime, and 0.3 part of dibutyltin dilaurate under a moisture-free condition, followed by degassing to obtain composition A-14.

Composition A-14 was evaluated in the same manner as in Example 8. The results obtained are shown in Table 3.

COMPARATIVE EXAMPLE 6

In a universal kneader were charged 100 parts of α,ω-methyldi(methyl ethyl ketoxime)silyl)dimethyl polysiloxane having a viscosity of 20,000 cP and 15 parts of octamethyl-cyclotetrasiloxane-treated fumed silica having a specific surface area of 200 m$^2$/g, and kneaded at room temperature for 2 hours to obtain uniform base compound B-15. A hundred parts of base compound B-15 were mixed uniformly with 1.5 parts of methyltri(methyl ethyl ketoxime)silane methyl ethyl ketoxime, 0.5 part of γ-(β-aminoethyl)aminopropyltrimethoxysilane, and 0.3 part of dibutyltin dilaurate under a moisture-free condition, followed by degassing to obtain composition A-15.

Composition A-15 was evaluated in the same manner as in Example 8. The results obtained are shown in Table 3.

TABLE 3

|  | Example 8 A-12 | Compar. Example 5 A-13 | Example 9 A-14 | Example 6 A-15 |
|---|---|---|---|---|
| Initial Physical Properties: |  |  |  |  |
| Extrusion force (kgf) | 12.0 | 15.0 | 12.5 | 15.0 |
| Dry-tack time (min) | 10 | 10 | 10 | 10 |
| Hardness (JIS A) | 28 | 27 | 28 | 27 |
| Tensile strength | 19 | 18 | 18 | 18 |

TABLE 3-continued

|  | Example 8 A-12 | Compar. Example 5 A-13 | Example 9 A-14 | Example 6 A-15 |
| --- | --- | --- | --- | --- |
| (kgf/cm²) |  |  |  |  |
| Elongation (%) | 380 | 360 | 370 | 350 |
| Physical Properties after Aging (70° C. × 5 dys): |  |  |  |  |
| Extrusion force (kgf) | 12.5 | 17.0 | 13.5 | 17.0 |
| Dry-tack time (min) | 10 | 10 | 10 | 10 |
| Hardness (JIS A) | 26 | 25 | 26 | 25 |
| Tensile strength (kgf/cm²) | 18 | 16 | 17 | 16 |
| Elongation (%) | 390 | 350 | 380 | 360 |
| Tensile Shear Adhesive Strength (kgf/cm²): |  |  |  |  |
| Stainless steel | 16(100) | 10(80) | 15(100) | 11(80) |
| Aluminum | 15(100) | 5(30) | 16(100) | 4(20) |
| Epoxy resin | 12(100) | 2(0) | 12(100) | 2(0) |
| Glass | 16(100) | 14(100) | 14(100) | 12(100) |

While the invention has been described in detail and with reference to specific embodiments thereof, it will be apparent to one skilled in the art that various changes and modifications can be made therein without departing from the spirit and scope thereof.

What is claimed is:

1. A process for preparing a room temperature-curable organopolysiloxane composition comprising:

(A) 100 parts by weight of (A-1) a linear organopolysiloxane containing, per molecule, at least one structural unit represented by formula (I):

$$R^1_a X^1_b SiO_{(4-a-b)/2} \quad (I)$$

wherein $R^1$ which may be the same or different each represents a substituted or unsubstituted monovalent hydrocarbon group; $X^1$ represents a hydrolyzable group; a represents an integer of 0 to 2, and b represents an integer of 1 to 3, provided a+b is 1 to 3; and having a viscosity of 50 to 500,000 cSt at 25° C. and (A-2) a silicon compound represented by formula (II):

$$R^2_c SiX^2_{4-c} \quad (II)$$

wherein $R^2$ which may be the same or different each represents a substituted or unsubstituted monovalent hydrocarbon group or a hydrogen atom; $X^2$ represents a hydrolyzable group; and c represents an integer of 0 to 2; or a partial hydrolysis product thereof, with the proviso that the amount of (A-1) is from 80 to 100% by weight based on the total weight of (A-1) and (A-2), (B) 1.0 to 200 parts by weight of silica powder having a specific surface area of 20 to 800 m²/g, (C) 0.01 to 25 parts by weight of a curing catalyst, and (D) a silane coupling agent represented by formula (III) or (IV):

$$R^4_d Y_{3-d} Si-Z-NR^5_e R^6_{2-e} \quad (III)$$

$$R^4_d Y_{3-d} Si \underset{Z}{\overset{\diagdown\diagup}{-}} NR^5_e R^6_{2-e} \quad (IV)$$

wherein $R^4$ and $R^5$, which may be the same or different, each represent a substituted or unsubstituted monovalent hydrocarbon group or a hydrogen atom; $R^6$ represents $-SiR^7_f W_{3-f}$ wherein $R^7$ which may be the same or different each represents a substituted or unsubstituted monovalent hydrocarbon group or a hydrogen atom; W represents a hydrolyzable group; and f represents an integer of 0 to 3; Y represents a hydrolyzable group; Z represents a substituted or unsubstituted divalent hydrocarbon group; d represents an integer of 0 to 3; and e represents an integer of 0 to 2, or a linear organopolysiloxane having a substituent represented by

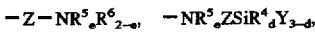

$$-Z-NR^5_e R^6_{2-e}, \quad -NR^5_e ZSiR^4_d Y_{3-d},$$

or

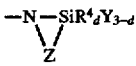

$$-N \underset{Z}{\overset{\diagdown\diagup}{-}} SiR^4_d Y_{3-d}$$

wherein $R^4$, $R^5$, $R^6$, Z, Y, d and e are the same as defined above, (D) being present in such an amount that it contains 300 to 3,000,000 ppm of nitrogen atom per 100 parts by weight of (A-1), which comprises adding component (D) to component (A) followed by mixing and kneading, and then adding component (B) to the resulting mixture, followed by mixing and kneading, or mixing and kneading components (A), (B) and (D), and then adding component (C) to the resulting mixture, followed by mixing and kneading.

2. A process according to claim 1, wherein $X^2$ in component (A) is a hydroxyl group or an alkoxy group.

3. A process according to claim 1, wherein component (D) is an aminoalkylalkoxysilane.

4. A process according to claim 1, wherein component (D) is an N-trialkylsilyl-3-aminopropyltrialkoxysilane.

5. A process according to claim 1, wherein component (D) is a 1,1-dialkoxy-2-trialkylsilyl-1-sila-2-azacyclopentane.

6. A process according to claim 1, wherein component (D) is a linear polysiloxane compound containing a substituted or unsubstituted amino group.

* * * * *